United States Patent [19]

Hayashi

[11] 4,445,341
[45] May 1, 1984

[54] AUTOMATIC SWITCHING SYSTEM FOR CAR COOLER

[76] Inventor: Mikio Hayashi, 26-5, Toyotama-minami 2-chome, Nerima-ku, Tokyo, Japan

[21] Appl. No.: 391,262

[22] Filed: Jun. 23, 1982

[51] Int. Cl.³ .................. B60H 3/04; H01H 35/40
[52] U.S. Cl. ................... 62/133; 188/380; 200/83 A
[58] Field of Search .......... 62/133; 200/83 A, 83 S; 188/380

[56] References Cited

U.S. PATENT DOCUMENTS

| | | | |
|---|---|---|---|
| 2,541,858 | 2/1951 | Boehm | 188/67 X |
| 3,348,009 | 10/1967 | Staples | 200/83 S |
| 3,538,275 | 11/1970 | Greene | 200/83 R |
| 4,275,688 | 6/1981 | Abe et al. | 62/133 |
| 4,296,287 | 10/1981 | Boulanger et al. | 200/83 S |
| 4,359,875 | 11/1982 | Ohtani | 62/133 |

Primary Examiner—William E. Wayner
Attorney, Agent, or Firm—Ladas & Parry

[57] ABSTRACT

An automatic switching system for car cooler is disclosed.

In consideration of the fact that the maximum load is imposed on an engine in acceleration period and the vacuum pressure is introduced to a diaphragm room and a diaphragm enforced by a spring member is in response to the vacuum pressure and the switching member is connected perpendicular to the center of the diaphragm is moved to make/break the contact of car cooler.

By these provisions, the load on the engine in acceleration can be reduced and fuel consumption can be saved.

2 Claims, 5 Drawing Figures

AUTOMATIC SWITCHING SYSTEM FOR CAR COOLER

BACKGROUND OF THE INVENTION

A. Field of the Invention

The present invention relates generally to an automatic switching system for car cooler, or more precisely, to a mechanical switch in which a vacuum pressure of an engine is introduced to a disphragm room and the diaphragm which is enforced by a spring member is distorted by the vacuum pressure and a switching member which is attached to a center rod connected perpendicular to the center of the diaphragm is moved so that a contact of the car cooler is switched, thereby the car cooler is stopped in an acceleration period in which the maximum load is imposed on the engine and, in the period other than the acceleration, the car cooler is permitted to be workable.

B. Description of the Prior Art

A car cooler is mounted on a vehicle which runs about a hot region in summer so as to secure a comfortable driving. In such car cooler, a compressor of it is worked utilizing an engine output of the vehicle, so a faitly amount of load is imposed on the engine. Particularly in the period of acceleration of the vehicle, an extreme effort of the engine is needed for acceleration itself. So, it will be an excessive burden for the engine that the car cooler is being worked together with the acceleration, therefore, the degradation of the acceleration performance and increase of fuel consumption are resulted.

For resolving such problems, it will be wise to let the car cooler stop in acceleration period so as to decrease the load imposed on the engine. Then, such resolution will be good not only for the engine, but also for the cooling effect of the room of vehicle.

For the example of switching system of car cooler for such use, there are a turn switch which is manually operated and an automatic switching system which is turned on when the rotation number of the engine is more than 1,000 r.p.m. and turned off below that.

But, the manual switch for car cooler is not practical, because the operation for turning on and off is troublesome. By the automatic switching system which counts the rotation number of the engine, the car cooler can not be worked when the rotation number is about 600 r.p.m., for instance in the idling period of engine, accordingly, the cooling effect can not be expected when the car cooler is stopped. In other words, so long as the car cooler is turned on/off according to the rotation number of engine, the car cooler can not be worked or stopped in response to many kinds of driving conditions such as idling or so forth, although the car cooler is stopped in the acceleration period.

SUMMARY OF THE INVENTION

Accordingly, it is a primary object of the present invention to obtain an improved automatic switching system for car cooler. Other object of the present invention is to obtain the automatic switching system by which the car cooler is worked or stopped in exact response to many kinds of driving conditions of vehicle. It is further object of the present invention to provide the automatic switching system by which the compressor is always on except the period of acceleration and the vehicle is kept cooling when the rotation number is decreased, for example in the period of stoppage of vehicle. Other object of the present invention is to obtain the automatic switching system for car cooler by which the operation period of the car cooler can exactly be managed so as to reduce the fuel consumption without the degradation of acceleration performance.

To achieve these objects, the automatic switching system for car cooler according to the present invention comprises; a diaphragm room which is divided into two compartments by the diaphragm and a vacuum pressure which varies in accordance with the running conditions is introduced from an intake-manifold of an engine into a pressure compartment and other open compartment is in air communication, a dielectric base plate which is provided in adjacent to the open compartment and has a plurality of contavts to which a lead wire of electric source for a compressor of car cooler is connected, a center rod one end of which is attached perpendicular to the center of the diaphragm and the middle portion is reciprocably inserted into a center hole of the base plate and a switching member for making or breaking contacts is attached, a spring member which is provided in the pressure compartment in compliance with the axial direction of the center rod for pressing the diaphragm to the direction of the base plate, so that, when the vacuum pressure of the intake manifold is lowered in the acceleration period in which the maximum engine power is needed, the diaphragm and the center rod is pressed by the spring member and the switching member is separated from the contact to cut off the electric source of the compressor.

These and other objects of the present invention will more fully be understood by the following description with reference to the attached drawings. However these descriptions show only an embodiment of the present invention and the invention is not limited to such embodiment.

DETAILED DESCRIPTION OF PREFERRED EMBODIMENTS

Figure 1:
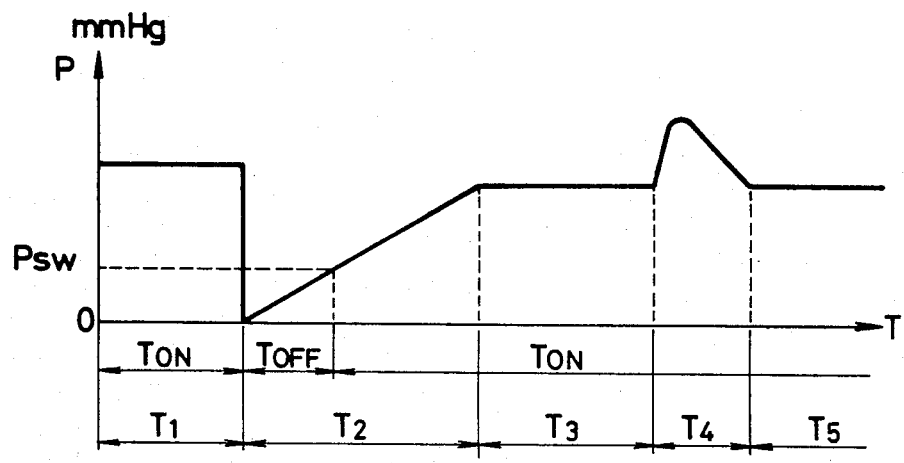
FIG. 1 is a graph showing a relation between a vacuum pressure of intake manifold and an operation of the automatic switching system of car cooler according to the present invention.

In FIG. 1, a vacuum pressure of an intake manifold of engine is indicated in mm Hg unit along an ordinate and the progress of time at various running conditions is shown along an abscissa. $T_1$ indicates an idling period in which the vacuum pressure P is constant at approximately 450 mm Hg. In the acceleration period $T_2$, the vacuum pressure falls down once to zero and gradually rises with the progress of time. At the period $T_3$ in which a speed of vehicle is constant, the vacuum pressure reaches 400 mm Hg. The pressure P is constant in the period $T_3$, but the pressure P rises to 600 mm Hg at a deceleration period $T_4$ and the pressure P goes back constant again at constant velocity period $T_5$.

In the automatic switching system according to the present invention, the vacuum pressure P of such characteristic is detected in order to stop the car cooler in the acceleration period in which the maximum engine power is needed so as to reduce the load imposed on the engine. The compressor of the car cooler is stopped by a mechanical switching system described hereinafter in the period when the vacuum pressure is below 140–150 mm Hg (see $T_{off}$). On the contrary, in the period when the vacuum pressure P is above 140–150 mm Hg, the compressor is at least workable (see $T_{on}$ and switching pressure $P_{sw}$).

Figure 2:
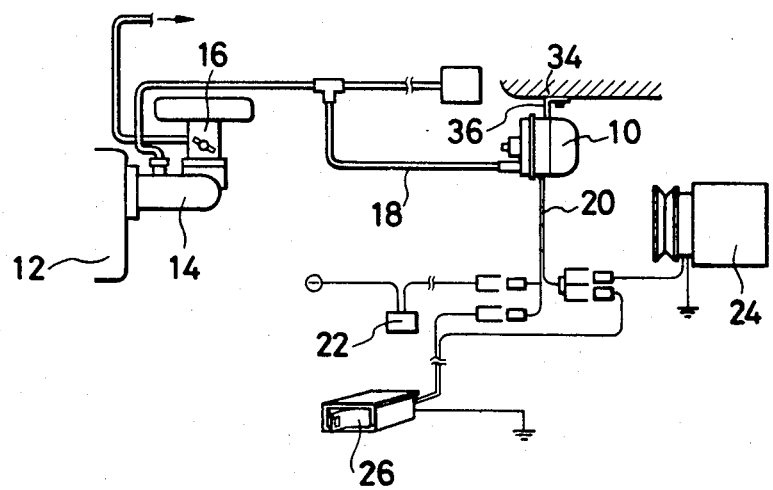
FIG. 2 is a diagram showing the position of the automatic switching system.

In FIG. 2, a provision of the automatic switching system according to the present invention is shown diagrammatically in which numeral 10 indicates an automatic switch, numeral 12 an engine of vehicle, numeral 14 intake manifold and numeral 16 indicates a carburetor. The automatic switch 10 communicates via a hose 18 with the intake manifold 14 in order to detect the vacuum pressure. An electric signal from the automatic switch 10 is fed by a lead wire 20 to a compressor 24 which is separately provided from a car cooler 22. Numeral 26 indicates a change-overswitch for deciding beforehand whether or not the automatic switch 10 should be set.

Figure 3:
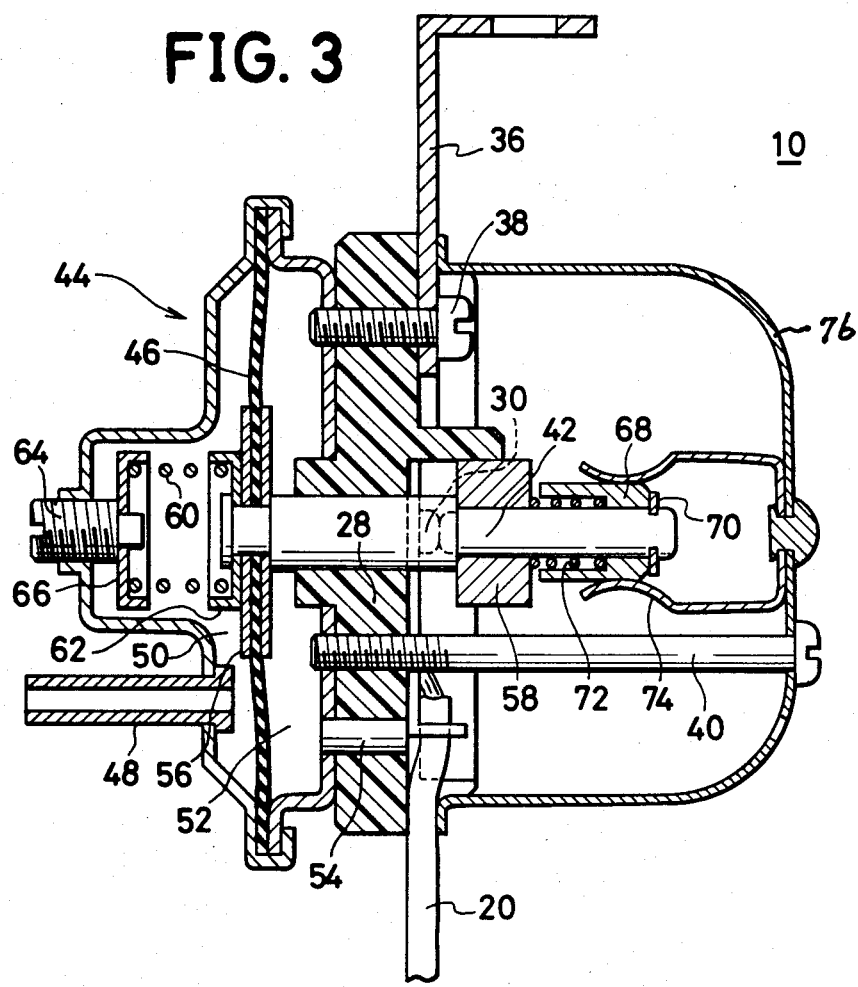
FIG. 3 is a cross-sectional view of the switching system according to the present invention.
Figure 4:
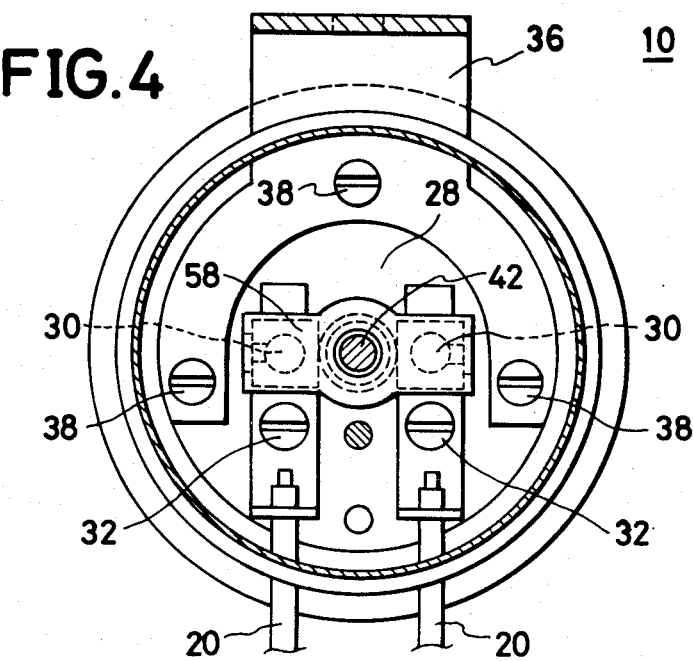
FIG. 4 is a plan view showing a contact portion of the switching system.
Figure 5:
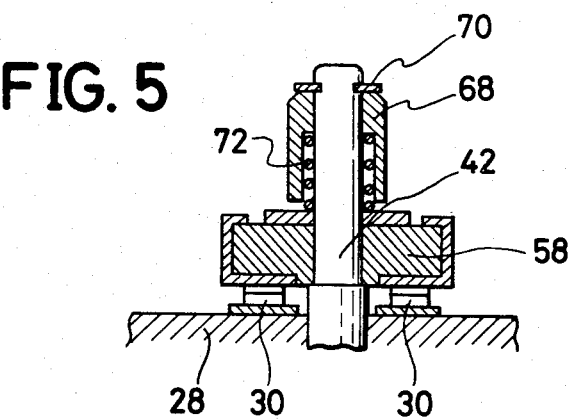
FIG. 5 is a cross-sectional view of the contact portion of FIG. 4.

FIG. 3 is a cross-sectional view showing a mechanical constitution of the automatic switch according to the present invention. A dielectric base plate made of thermo-setting plastic such as phenol resin is provided and one end of the lead wire 20 of FIG. 2 is connected to a plurality of contacts 30 which are symmetrically attached in relation to the center of the base plate 28 by screws 32 as shown in FIG. 4. These plated contacts 30 are protruded from the plane of base plate 28 as shown in FIG. 5. A flange 36 for fixing the switch 10 to a fender 34 in FIG. 2 is attached to the base plate 28 by screws 38. A cover member 76 for protecting the contacts 30 from dusts in atmosphere is fixed to the base plate 28 by a screw 40. A throughhole is provided at the center of base plate 28 and a center rod 42 is reciprocably put in the hole. The center rod 42 The center rod 42 will be described in detail hereafter.

On the opposite side of the base plate 28, a diaphragm room 44 is fixed to the base plate 28 by screws 38, 40. A diaphragm 46 made of rubber is provided in the middle portion of the diaphragm room 44 to separate the room into two compartments. A hose joint 48 is attached to one of the compartments, namely a pressure compartment 50. One end of the hose 18 which is in communication with the intake manifold 14 of the engine in FIG. 2 is connected to the hose joint 48 and the vacuum pressure P which has a pressure characteristic detailed in FIG. 1 is introduced to the pressure compartment 50. Other compartment, namely an open compartment 52, is in air communication via an air hole 54 provided at the base plate 28. As the vacuum pressure P is introduced to one of the compartments of diaphragm room 44 and the air is led to other compartment, the diaphragm 46 is distorted in the right direction of FIG. 3 when the vacuum pressure P is lowered. One end of the center rod 42 is connected perpendicular to the center of the diaphragm with a reinforce plate 56. The center rod 42 is extended by way of the center of the base plate 28 to the direction of contacts 36 and a switching member 58 for making/breaking contacts 38 is movably attached to the center rod 42. The switching member 58 makes circuits only when it contacts with the contacts 36. On the contrary, an electric power is not transmitted to the compressor 24 when the switching member 58 is away from the contacts 36 by the movement of the center rod 42. In other words, the switching member 58 is normal-closed type and the gap from the contacts 36 is about 0.5 mm.

Referring again to FIG. 3, the diaphragm side of the center rod 42 is pressed by a spring member 60. A saucer-like spring holder 62 is fixed to the reinforce plate 56 and an adjustable screw 64 is screwed to the wall of the diaphragm room 44. Other saucer-like spring holder 66 is fixed to pressure compartment side of the adjustable screw 64. The spring member 60 is stretched between these saucer-like spring holders 62, 66 to press the center rod 42 to the direction of base plate 28. An elastic force of the spring member 60 is determined in consideration of the vacuum pressure P and the deformation of the diaphragm 46. The pressing force to the center rod 42 is adjustable by turning the adjustable screw 64 whose end is protruded out of the diaphragm room 44 so as to change the position of the spring holder 66. Thereby, the switching pressure $P_{sw}$ can be altered.

As described in detail, the basic comception of the automatic switching system according to the present invention is that, in case the vacuum pressure P falls down below the switching pressure $P_{sw}$ in the acceleration period of engine 12, the diaphragm 46 is deformed in the right direction of FIG. 3 to press forward the center rod 42 and the switching member 58 of the center rod 42 is separated from the contact 30, thereby the compressor of the car cooler is stopped and the load imposed on the engine 12 is reduced. On the contrary, in case of idling, constant speed running and deceleration, the vacuum pressure is above $P_{sw}$ as shown in FIG. 1, accordingly, the spring member 60 is contracted by the air pressure on the diaphragm and the switching member 58 of the center rod 42 makes the contacts 30, thereby the compressor 24 can be worked.

By the way, the vacuum pressure P fluctuates, though it seems rectilinear in macro-scopic standpoint of view and a minute fluctuation will be caused in the diaphragm 46 and the center rod 42. In case such surging occurs near the switching pressure $P_{sw}$, the automatic switch 10 is switched a number of times in a short period, accordingly, the compressor 24 is frequently turned on and off. In order to prevent such surging, a cylindrical slide member 68 is slidably fitted to the switching member 58 end of the center rod 42 as shown in FIGS. 3 and 5. The slide member 68 is movable between the switching member 58 and a stopper 70 at forward end of the slide member 68 and the member 68 is pressed toward the stopper 70 by a spring 72. A slidable spring member 74 is fixed at the center of cover member 76. The narrow mouth portion of the slidable spring member elastically contacts with the periphery of the slidable member 68. By these provisions, restrictive force is transmitted from the spring 74—slidable member 68—spring 72—switching member 58 to the center rod 42 and the surging to fluctuate the switching member 58 can be prevented.

Many modification and application are possible regarding the present invention and it is not limited to the embodiment described.

What is claimed:

1. An automatic switching system for car cooler comprising a diaphragm room which is divided into two compartments by a diaphragm, a vacuum pressure which varies in accordance with the running conditions being introduced from an intake manifold of an engine into a first pressure compartment and the other open compartment being in air communication, a dielectric base plate which is provided adjacent to the open compartment and has a plurality of contacts to which a lead wire of an electric power source for a compressor of car cooler is connected, a center rod one end of which is attached perpendicular to the center of the diaphragm and the middle portion is reciprocably inserted into a center hole of the base plate, a switching member for making/breaking contacts attached to a spring member which is provided in the pressure compartment in compliance with the axial direction of the center rod for pressing the diaphragm to the direction of the base plate so that, when the vacuum pressure of the intake manifold is lowered in the acceleration period in which maximum engine power is needed, the diaphragm and the center rod is pressed by the spring member and the switching member is separated from the contacts to cut off the electric source of the compressor, and a slide member which is slidably fitted to the center rod side of the switching member and enforced by a slide spring whose center is fixed to a cover member of base plate and both ends are elastically in contact with the periphery of the slide member so as to prevent the surging of the center rod.

2. An automatic switching system for car cooler according to claim 1, wherein one end of the spring member opposite to the diaphragm is taken by a saucer-like spring holder, an adjustable screw being connected to the spring holder, one end of the adjustable screw being extended out of the pressure compartment, so that the pressing force of the spring member can be adjusted.

* * * * *